United States Patent
Siaka

(10) Patent No.: US 10,710,550 B2
(45) Date of Patent: Jul. 14, 2020

(54) GUARD DOG VEHICLE ALARM SYSTEM

(71) Applicant: Mamadou Ouattara Siaka, Bronx, NY (US)

(72) Inventor: Mamadou Ouattara Siaka, Bronx, NY (US)

(*) Notice: Subject to any disclaimer, the term of this patent is extended or adjusted under 35 U.S.C. 154(b) by 0 days.

(21) Appl. No.: 16/282,297

(22) Filed: Feb. 22, 2019

(65) Prior Publication Data

US 2019/0256045 A1 Aug. 22, 2019

Related U.S. Application Data

(60) Provisional application No. 62/633,417, filed on Feb. 21, 2018.

(51) Int. Cl.
| | |
|---|---|
| *G08B 21/00* | (2006.01) |
| *B60R 25/104* | (2013.01) |
| *B60R 25/30* | (2013.01) |
| *G08B 13/196* | (2006.01) |
| *B60R 25/40* | (2013.01) |

(52) U.S. Cl.
CPC .......... *B60R 25/104* (2013.01); *B60R 25/302* (2013.01); *B60R 25/305* (2013.01); *B60R 25/403* (2013.01); *G08B 13/19647* (2013.01); *B60R 2325/205* (2013.01)

(58) Field of Classification Search
CPC ............ B60R 2325/205; B60R 25/104; B60R 25/302; B60R 25/305; B60R 25/403; G08B 13/19647
USPC ...................................... 340/426.6
See application file for complete search history.

(56) References Cited

U.S. PATENT DOCUMENTS

| | | | | |
|---|---|---|---|---|
| 5,900,823 A | * | 5/1999 | Coll-Cuchi | B60R 25/04 307/10.3 |
| 6,002,326 A | * | 12/1999 | Turner | B60R 1/00 180/287 |
| 6,147,598 A | * | 11/2000 | Murphy | B60R 25/102 307/10.2 |
| 6,480,098 B2 | * | 11/2002 | Flick | B60R 25/04 307/10.2 |
| 9,315,152 B1 | * | 4/2016 | Maestas | B60R 25/305 |
| 2006/0192659 A1 | * | 8/2006 | Fazio | B60R 25/1004 340/426.18 |
| 2010/0087981 A1 | * | 4/2010 | Orozco-Perez | H04L 67/12 701/29.5 |

(Continued)

*Primary Examiner* — Mark S Rushing
(74) *Attorney, Agent, or Firm* — Lyman Moulton, Esq.; Moulton Patents, PLLC

(57) ABSTRACT

A vehicle alarm system includes motion sensors to detect motion outside the vehicle, cameras disposed on an interior of the vehicle capable of recording activity on an exterior perimeter of the vehicle, redundant control panels that control settings related to the vehicle alarm system and are distributed in and outside the vehicle, an alarm triggered by one of the redundant control panels in response to the motion sensors to provide a visual and an audible warning in a vicinity of the vehicle, an independent battery configured to power only the vehicle alarm system independent of an electrical power delivery of the vehicle, and a security box to record all vehicle alarm system activities, an access to the security box based on an access code matched to a registration of the vehicle. Wolf pack security for multiple vehicles, imprinting alpha and beta masters and voice recognition 'call' features are also included.

18 Claims, 3 Drawing Sheets

(56) References Cited

U.S. PATENT DOCUMENTS

2012/0126997 A1* 5/2012 Bensoussan ............. B60Q 1/52
340/905
2018/0173230 A1* 6/2018 Goldman-Shenhar .......................
G08G 1/167

* cited by examiner

100

At least one motion sensor configured to detect motion outside the vehicle in a half-dome volume enclosing the vehicle

110

A plurality of cameras disposed on an interior of the vehicle wherein the cameras are capable of recording activity on an exterior perimeter of the vehicle in the half-dome volume triggered by the at least one motion sensor

120

A plurality of redundant control panels that control a setting related to the vehicle alarm system, the redundant control panels distributed in and outside the vehicle and comprising control and communication circuits

130

An alarm triggered by one of the redundant control panels in response to the at least one motion sensor, the alarm configured to provide a visual and an audible warning to deter criminal activity in a vicinity of the vehicle alarm system

140

An independent battery configured to power only the vehicle alarm system, the independent battery and the power delivery thereof configured independent of a power delivery of the vehicle

150

A security box configured to record all vehicle alarm system activities, the security box powered by the independent battery, and an access to the security box based on an access code matched to a registration of the vehicle

FIG. 2

GUARD DOG VEHICLE ALARM SYSTEM

CROSS REFERENCE TO RELATED APPLICATION

This application claims the benefit of the priority date of earlier filed U.S. Provisional Patent Application Ser. No. 62/633,417 filed Feb. 21, 2018 by Mamadou Ouattara Siaka, and is incorporated herein by reference in its entirety.

BACKGROUND OF THE INVENTION

Field of Invention

The present invention relates to a vehicle alarm system that has various security features.

Description of Related Art

Personal security is a major concern for many individuals. Due to the high rate of crime people may become victims of crime at any time or anyplace. There are particular risks when an individual is entering and leaving their home. Most individuals use automobiles for transportation therefore individuals are exposed as they leave a parked vehicle enter a building or their home. As such it's imperative to have an adequate security system within the motor vehicle. A number of motor vehicles come with alarm systems to detect theft however additional security would be advantageous to provide protection for individuals as they leave and enter the vehicle. In terms of home security, many individuals may have an alarm system along with a security dog that provides a level of protection. The alarm system could alert of burglary but also the dog could deter a burglar.

It is the object of the present invention to incorporate additional personal security systems within a motor vehicle so that an individual is more protected while near or around the vehicle.

SUMMARY OF THE DISCLOSURE

A vehicle alarm system includes motion sensors to detect motion outside the vehicle, cameras disposed on an interior of the vehicle capable of recording activity on an exterior perimeter of the vehicle, redundant control panels that control settings related to the vehicle alarm system and are distributed in and outside the vehicle, an alarm triggered by one of the redundant control panels in response to the motion sensors to provide a visual and an audible warning in a vicinity of the vehicle, an independent battery configured to power only the vehicle alarm system independent of an electrical power delivery of the vehicle, and a security box to record all vehicle alarm system activities, an access to the security box based on an access code matched to a registration of the vehicle. Wolf pack security for multiple vehicles, imprinting alpha and beta masters and voice recognition features are also included.

BRIEF DESCRIPTION OF DRAWINGS

FIG. 2 depicts a block diagram of the vehicle alarm system components in accordance with the present invention.

DETAILED DESCRIPTION

The present invention relates to the implementation of a security system within a motor vehicle that has additional cameras installed in the vehicle for both exterior and interior views. Further a motion sensor is equipped on the vehicle to detect motion near and around the vehicle. Further the present invention implements a dog bark alarm aspect to the security system.

The present relates to the implementation of an alarm system on a motor vehicle that includes multiple cameras, motion sensors and control systems with an audible alarm available on the vehicle. The cameras record all activity near and around the vehicle upon detection by a motion sensor that detects motion near and around the vehicle. The camera systems may also operate while the individual operates the vehicle to detect and record any motor vehicle accidents that might occur during operation. The alarm system also has an audible aspect. The audio aspects include a barking alarm system that mimics the sound of a dog.

Figure 1:
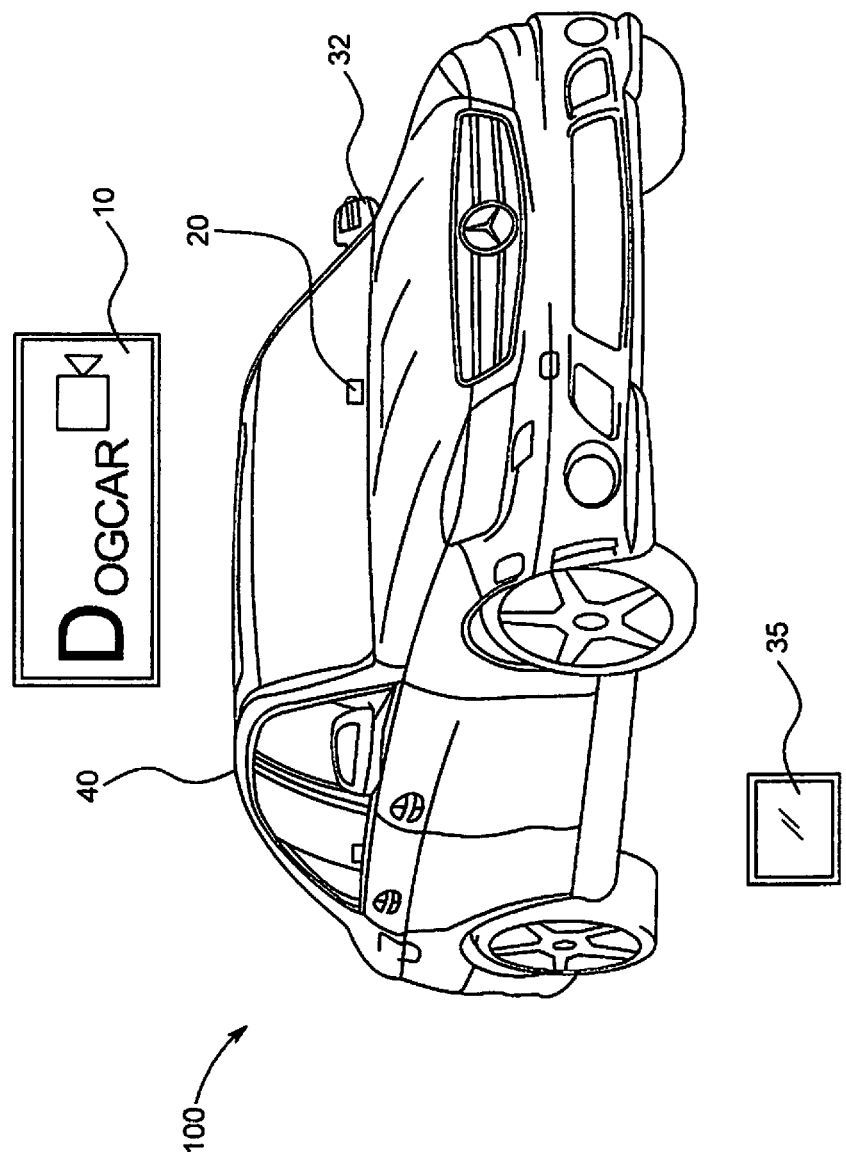
FIG. 1 depicts a vehicle alarm system in accordance with the present invention.

In reference to FIG. 1, a depiction of a motor vehicle with the alarm system according to present invention is depicted. Vehicle 100 as shown includes an audible alarm 40 installed in the vehicle that emits an audible sound in the sound of a dog barking. Other features of the alarm are motion sensors 20 placed around the vehicle to detect any motion near the vehicle. Cameras 32 are also installed in the interior of the vehicle that are able to record activity both inside and outside surrounding the entire perimeter of the vehicle. A control panel 35 is provided within the vehicle to control any aspect of the alarm system.

The alarm system upon detection of motion is able to record any activity that may occur in and around the vehicle. This feature can deter vandalism and theft of the vehicle. The camera system records all activity and is therefore available for review by the owner and authorities in order to detect the suspects or criminals who engaged in the activity. Further the motion sensors 20 activate the camera if any carjacking attempts or other activity around the vehicle detection is also recorded. Recording also takes place if there is a police stop associated with the vehicle and therefore records all activity between the police officer and passengers.

While the recording system provides a complete system that records all activity and provides an audible alarm 40 while unoccupied to deter criminal activity near and around the vehicle. Control Panel 35 is used to control the system parameters and the system is designated with a logo 10 as shown in FIG. 1 to alert third parties of its presence.

This invention is operational regardless of whether the vehicle is being driven by the owner or parked and unattended. Video recordings show any criminal attempting to steal the wheels, hot-wire the ignition, break the window glass, or steal an expensive sound system.

Similarly, the system records an attempted physical assault, carjacking, police encounters, road rage incidents, a robbery, and hit and run accidents. In a hit and run, it shows the other car's license plate and other details for an accurate description. The recorded visual evidence is provided to the police, the insurance company, an attorney and even presented in court as clear and unbiased evidence.

The versatile electronic features of the disclosure even record motor vehicle accidents as they occur on streets and highways. It provides a means of proving another careless, drunk, or distracted driver was at fault, especially when there were no independent eyewitnesses. The alarm system included with this invention sounds automatically in response to any movement around the car at any time.

In reference to FIG. 2, the vehicle alarm system includes motion sensors 100 to detect motion outside the vehicle, cameras 110 disposed on an interior of the vehicle capable of recording activity on an exterior perimeter of the vehicle, redundant control panels 120 that control a setting related to the vehicle alarm system and are distributed in and outside the vehicle, an alarm 130 triggered by one of the redundant control panels in response to the at least one motion sensor, to provide a visual and an audible warning in a vicinity of the vehicle alarm system, an independent battery 140 configured to power only the vehicle alarm system independent of a power delivery of the vehicle, and a security box 150 to record all vehicle alarm system activities, an access to the security box based on an access code matched to a registration of the vehicle.

Figure 3:
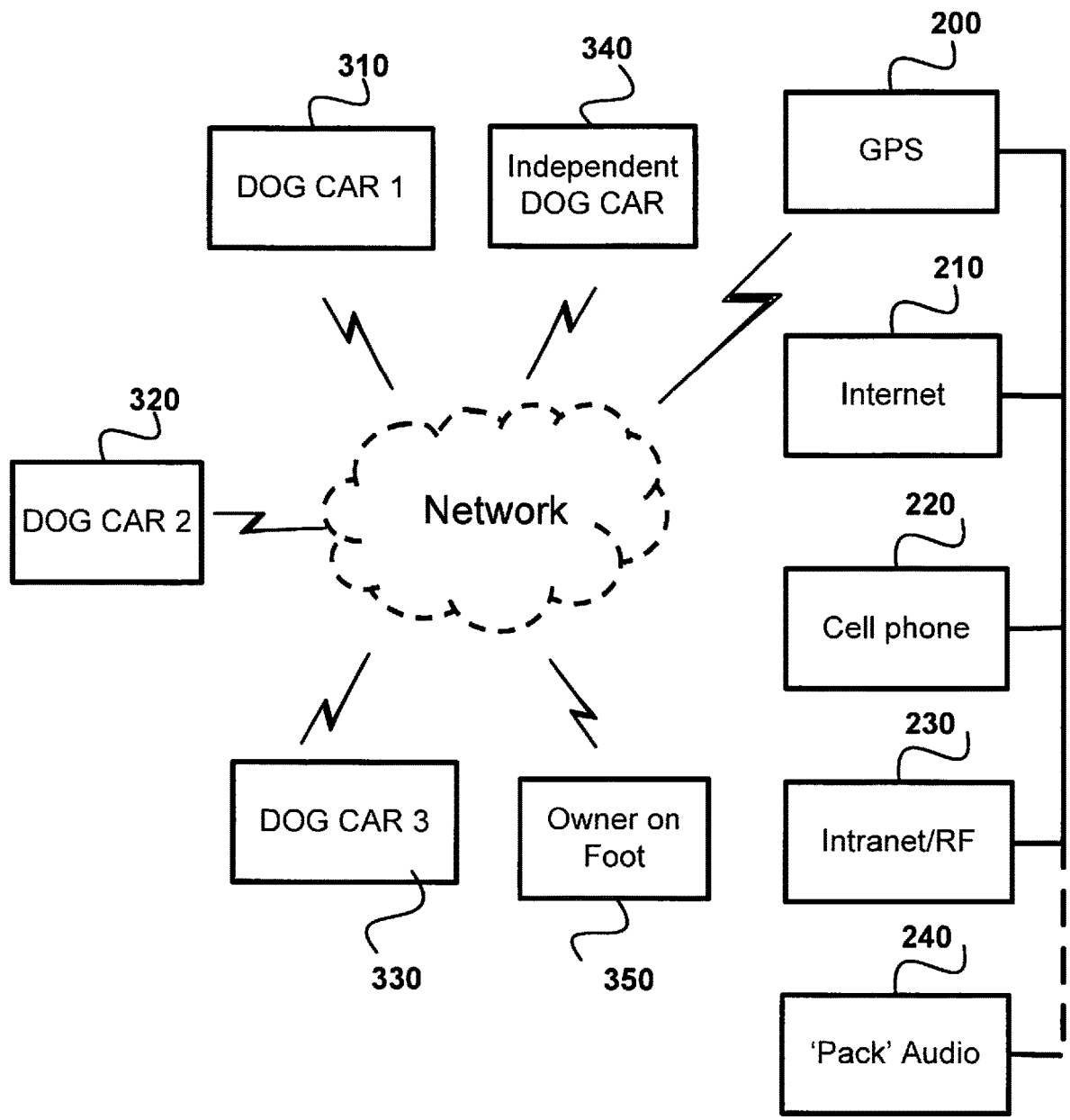
FIG. 3 depicts a block diagram of the communications of one and several vehicle alarm systems in a 'wolf pack' and independent configurations in accordance with the present invention.

FIG. 3 depicts a block diagram of the communications of one and several vehicle alarm systems in a 'wolf pack' and independent configurations in accordance with the present invention. The depiction includes a GPS 200, an internet capability 210, an intranet or radio frequency module 230, a 'pack' audio module 240 included in a watch dog vehicle alarm system and a cell phone 220 associated with an owner of the vehicle. A first Dog Car 310, a second dog car 320, a third dog car 330 are associated in a 'wolf pack' or 'wolf gang' grouping of vehicles having the disclosed vehicle alarm system. An independent dog car 340 and a vehicle owner on foot 350 are communicate and coordinate security via a network as shown.

The instant invention has been shown and described in what it considers to be the most practical and preferred embodiments. It is recognized, however, that departures may be made there from within the scope of the invention and that obvious modifications will occur to a person skilled in the art.

What is claimed is:

1. A vehicle alarm system comprising;
   at least one motion sensor configured to detect motion outside a vehicle in a dome volume surrounding the vehicle,
   a plurality of cameras disposed on an interior of the vehicle wherein the cameras are capable of recording activity on an exterior perimeter of the vehicle in the dome volume triggered by the at least one motion sensor;
   a plurality of redundant control panels that control a setting related to the vehicle alarm system, the redundant control panels distributed in and outside the vehicle and comprising control and communication circuits;
   an alarm triggered by at least one of the redundant control panels in response to the at least one motion sensor, the alarm configured to provide a visual and an audible warning to deter criminal activity in a vicinity of the vehicle alarm system; and
   a security box configured to record all vehicle alarm system events, wherein an access to the security box is based on an access code matched to a registration of the vehicle.

2. The vehicle alarm system of claim 1, further comprising a dedicated battery to power the alarm system, the dedicated battery and the power delivery thereof configured independent of a power delivery of the rest of the vehicle.

3. The vehicle alarm system of claim 1, wherein one of the redundant control panels is simulated by an owner's cell phone, by communicating with the owner's cell phone using similar functionality to the redundant control panels, in communication with a registering company and a cloud data repository.

4. The vehicle alarm system of claim 1, wherein the visual warning comprises a running dog display and a logo display on a front windshield and on a back window of the vehicle.

5. The vehicle alarm system of claim 1, wherein one of the redundant control panels is configured to communicate with an intranet inside the vehicle and with the internet outside the vehicle.

6. The vehicle alarm system of claim 1, wherein each redundant control panel further comprises a Global Positioning Satellite (GPS) circuit.

7. The vehicle alarm system of claim 1, further comprising a battery power supply configured to charge on the vehicle's operation and configured to have an independent power train therefrom.

8. The vehicle alarm system of claim 1, further comprising a battery power supply configured with a cold temperature fail safe heater powered by the vehicle battery power supply.

9. The vehicle alarm system of claim 1, wherein the settings include a predetermined duration of motion and a predetermined distance of motion from an outside of the vehicle.

10. The vehicle alarm system of claim 1, wherein the audible alarm comprises a plurality of dog barking sounds.

11. The vehicle alarm system of claim 1, further comprising an owner override button on an inside of the vehicle and on a cell phone, the override configured to suppress the alarm.

12. The vehicle alarm system of claim 1, wherein the at least one motion sensor is configured to sense motion in darkness via an electromagnetic motion detection array.

13. The vehicle alarm system of claim 1, wherein the camera takes video at a nominal ten thousand cycles per second in daylight and at night.

14. A vehicle alarm system comprising;
    at least one motion sensor configured to detect motion outside a vehicle in a dome volume surrounding the vehicle,
    a plurality of cameras disposed on an interior of the vehicle wherein the cameras are capable of recording activity on an exterior perimeter of the vehicle in the dome volume triggered by the at least one motion sensor;
    a plurality of redundant control panels that control a setting related to the vehicle alarm system, the redundant control panels distributed in and outside the vehicle and comprising control and communication circuits;
    an alarm triggered by one of the redundant control panels in response to the at least one motion sensor, the alarm configured to provide a visual and an audible warning to deter criminal activity in a vicinity of the vehicle alarm system;
    an independent battery configured to power only the vehicle alarm system, the independent battery and the power delivery thereof configured independent of a power delivery of the vehicle; and
    a security box configured to record all vehicle alarm system activities, the security box powered by the independent battery, and an access to the security box based on an access code matched to a registration of the vehicle.

15. The vehicle alarm system of claim 14, further comprising a voice recognition module configured to communicate with the alarm system via a cell phone and a redundant control panel to enable voice control of the vehicle alarm system.

16. The vehicle alarm system of claim 14, wherein a plurality of vehicle alarm systems further comprise a 'wolf pack,' coordinated security system in a plurality of vehicles to widen security and deterrent influence.

17. The vehicle alarm system of claim 14, further comprising a circuit of the redundant control panels configured to allow an owner to 'call,' his vehicle to him in an autonomous operation.

18. The vehicle alarm system of claim 14, further comprising a circuit of the redundant control panels configured to allow an 'imprint' of an alpha master and beta masters as specified by the owner onto the vehicle alarm system settings.

* * * * *